(12) United States Patent
Russell

(10) Patent No.: US 6,954,808 B2
(45) Date of Patent: *Oct. 11, 2005

(54) EXTENDER FOR UNIVERSAL SERIAL BUS

(75) Inventor: William C. Russell, Laguna Hills, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/417,082

(22) Filed: Apr. 17, 2003

(65) Prior Publication Data

US 2003/0177294 A1 Sep. 18, 2003

Related U.S. Application Data

(62) Division of application No. 09/218,424, filed on Dec. 22, 1998, now Pat. No. 6,584,519.

(51) Int. Cl.[7] .............................................. G06F 13/14
(52) U.S. Cl. ..................... 710/62; 710/104; 710/106; 710/129; 709/230; 709/233
(58) Field of Search ......................... 710/62, 104, 106, 710/129; 709/230, 233, 245–250

(56) References Cited

U.S. PATENT DOCUMENTS

| | | | |
|---|---|---|---|
| 4,902,989 A | 2/1990 | Glaab | 333/100 |
| 5,475,778 A | 12/1995 | Webb | 385/31 |
| 5,615,344 A | 3/1997 | Corder | 395/309 |
| 5,675,813 A | 10/1997 | Holmdahl | 395/750 |
| 5,696,949 A | 12/1997 | Young | 713/400 |
| 5,717,737 A | 2/1998 | Doviak et al. | 455/403 |
| 5,745,794 A | 4/1998 | Poloniewicz et al. | 395/882 |
| 5,767,844 A | 6/1998 | Stoye | 345/212 |
| 5,781,028 A | 7/1998 | Decuir | 326/30 |
| 5,787,259 A | 7/1998 | Haroun et al. | 709/253 |
| 5,799,196 A | 8/1998 | Flannery | 395/750.03 |
| 5,802,151 A | 9/1998 | Bevill, Jr. et al. | 379/93.05 |
| 5,890,015 A | 3/1999 | Garney et al. | 710/62 |
| 5,935,224 A | 8/1999 | Svancarek et al. | 710/63 |
| 6,040,792 A | 3/2000 | Watson et al. | 341/100 |
| 6,044,428 A | 3/2000 | Rayabhari | 710/129 |
| 6,058,441 A | 5/2000 | Shu | 710/100 |
| 6,084,638 A | 7/2000 | Hare et al. | 348/552 |
| 6,119,194 A | 9/2000 | Miranda et al. | 710/129 |
| 6,128,673 A | 10/2000 | Aronson et al. | 710/22 |
| 6,131,125 A | 10/2000 | Rostoker et al. | 709/250 |
| 6,182,497 B1 | 2/2001 | Krajci | 73/23.2 |
| 6,199,122 B1 | 3/2001 | Kobayashi | 710/36 |
| 6,282,591 B1 | 8/2001 | Ohtsuka | 710/65 |
| 6,308,215 B1 * | 10/2001 | Kolbet et al. | 709/233 |
| 6,351,533 B1 | 2/2002 | Parrott | 379/412 |
| 6,356,968 B1 | 3/2002 | Kishon | 710/129 |
| 6,389,029 B1 * | 5/2002 | McAlear | 370/402 |
| 6,584,519 B1 * | 6/2003 | Russell | 710/62 |

OTHER PUBLICATIONS

"USB Serial Converter Specification", <http://www.peracom.com/products/serial_converter.html>, Peracom (visited Dec. 21, 1998), 2 pages.

"USB Ethernet Adapter Specification (*)", <http://www.peracom.com/products/usb_ethernet.html> Peracom, (visited Dec. 21, 1998), 2 pages.

"EZ–Link", <http://www.ezlinkusb.com/>, EZ–Link Instant Network, (visited Dec. 21, 1998), 4 pages.

"USB Active Extension Cable", <http://www.deltalu.com/cable.htm>, Delta Lü Electronics, Inc., (visited Jan. 6, 1999), 1 page.

(Continued)

*Primary Examiner*—Jeffrey Gaffin
*Assistant Examiner*—Mike Nguyen
(74) *Attorney, Agent, or Firm*—Fitzpatrick, Cella, Harper & Scinto

(57) ABSTRACT

Cable length extension of universal serial bus (USB), through the provision of a transmitter hub coupled to a receiver hub over a non-USB data transport connection.

9 Claims, 5 Drawing Sheets

OTHER PUBLICATIONS

"USB Active Extension Cable", <http://deltalu.com/USB–AC–8.html>, (visited Jan. 6, 1999), 2 pages.

"USB Active Extension Cable", <http://www.deltalu.com/USB–AC–16.htm>, (visited Jan. 6, 1999), 2 pages.

"Byteport Turbo", <http://www.protec.ca/product/byteport.htm>, Protec Microsystems, Inc., (visited Jul. 1, 1998), 3 pages.

"Nuts and bolts of USB", <http://www.intel.com/design/usb/nutsbolt.htm>, Intel Corporation, (visited Oct. 16, 1998), 1 page.

"Why every new PC and peripheral should have USB", <http://www.intel.com/design/usb/prodbref/29776501.htm>, Intel Corporation, (visited Oct. 16, 1998), 1 page.

"The Universal Serial Bus: Signalling the Dawn of the Simple Peripheral Connection", <http://www.intel.com/design/usb/usbback.htm>, 2 pages, Intel Corporation, (visited Oct. 16, 1998), 1 page.

"EZLink™ USB", <http://www.ezlinkusb.com>, EZLink, (visited Oct. 16, 1998), 4 pages.

"The Universal Serial Bus from Abstraction to Implementation", M. Fennich, Intel Corporation.

"Universal Serial Bus and the Multimedia PC", K. Jaff, Intel Corporation, 1996.

Information on Home PhoneLine Networking Alliance (Home PNA), dated Jun. 1998 and before.

"Universal Serial Bus Specification", Compaq, et al., Revision 1.1, Sep. 23, 1998.

"1284Port". <http://www.fapo.com/1284.htm>, Warp Nine Engineering, (visited Jul. 1, 1998), 2 pages.

"The Kramer Tools", <http://www.kramerelectronics.com/vp14.html>, Kramer Electronics, (visited Jul. 1, 1998), 2 pages.

"IBM Parallel Port FAQ/Tutorial", <http://shell.rmi.net/~hi-sys/parport.html>, Z. Stewart, (visited Jul. 1, 1998), 18 pages.

"Interfacing the IBM PC Parallel Printer Port", <http://dragon.herts.ac.uk/data/datasheets/parallel.html>, Z. Stewart, (visited Jul. 1, 1998), 16 pages.

Information On Home Phoneline Networking Alliance (Home PNA), dated Jun. 1998 and before.

* cited by examiner

EXTENDER FOR UNIVERSAL SERIAL BUS

BACKGROUND OF THE INVENTION

1. Field of the Invention

The present invention relates to an extender for a universal serial bus (USB) that effectively extends USB cable length above its current approximate five meter limit. Specifically, the invention relates to USB transmit and receive hubs which respectively include non-USB data transport interfaces together with suitable USB-to-non-USB translators, that effectively extend the reach of USB devices.

2. Description of the Related Art

In the evolution of personal computers, one significant recent development is the introduction of universal serial bus (USB). USB is an interface that supports serial data transfers between a USB host computer (sometimes referred to as the "root node" or "root hub") and USB-capable peripherals. The host serves as the master of the bus, and the peripherals perform as slaves connected either directly to the host or indirectly through hubs, in a tiered star topology with one of the hubs at the center of each star.

Without USB, a personal computer requires a separate interface, with specialized electrical, mechanical and software connections, so as to be able to connect to each individual peripheral. Thus, without USB, a personal computer requires separate interfaces for its keyboard, monitor, modem, printer, microphone, joy stick, mouse, scanner, and so forth. With USB, on the other hand, USB-capable peripherals can be connected directly to USB hubs on the bus, without the need for any specialized software interfaces or mechanical or electrical interfaces.

USB is described with specificity in "Universal Serial Bus Specification", Version 1.1, Sep. 23, 1998, Compaq Computer Corporation, et al., the contents of which are incorporated herein by reference. Generally speaking, on any USB system, there is exactly one USB host which is typically a personal computer built around USB-capable motherboards and equipped with USB software. The host acts as master of the bus, acknowledging attachment and removal of peripherals, initiating enumeration processes and all subsequent USB transactions on the bus, collecting status and activity statistics, and controlling electrical interface between the host and USB peripherals. USB peripherals act as slaves on the bus and are of two types: "hubs" and "functions". A "hub" typically consists of a hub controller and a repeater, and usually converts a single upstream attachment point into multiple downstream attachment ports. "Functions" are PC peripherals like keyboards, joy sticks, cameras, printers and the like. A "Function" can be self-powered or bus-powered, meaning it derives its power from the USB bus; likewise, a "hub" can be self-powered or bus-powered, to provide power to downstream devices (which may be hubs or functions) attached to its ports.

USB cabling, which connects the host with peripherals (i.e., both hubs and functions) consists of four wires including a twisted pair for D+ and D− used for actual data transfer as well as a power wire and a ground wire. The cabling includes connectors that differ at the upstream and downstream sides, so as to prevent non-USB compliant connections and so as to ease use by preventing mis-cabling: a USB "A" type plug on the upstream side toward the USB host, and a USB "B" type plug toward the downstream side (towards the peripherals).

While USB provides good interconnectivity between the host and its peripherals, a limitation on the length of USB cabling presents a practical limitation on long distance data transfer. Specifically, because of electrical and frequency constraints, USB cable can be no longer than approximately five meters in length. It is possible to circumvent this length limitation to some extent, by end-to-end connection of multiple USB hubs, each of which acts as a repeater, with separate five meter lengths of cable therebetween. There are other practical limitations on such an arrangement, which in any event is expensive and inconvenient. Accordingly, a better solution is needed.

SUMMARY OF THE INVENTION

It is an object of the invention to provide for cable length extension of USB, through the provision of a transmitter hub coupled to a receiver hub over a non-USB data transport connection.

Specifically, according to one aspect, the invention is a USB transmitter hub which includes a USB "B" connector for downstream connection to a USB cable. The transmitter hub includes a USB-to-non-USB translator which translates USB communications into a suitably high speed non-USB format, which can be carried over long distances. Preferably, a serial data transport format is preferred, such as a data transport format that can be carried over standard Category 5 cabling over long distances. The transmitter hub further includes a non-USB interface connector, which preferably is an RJ45 connector, for connection over the non-USB data transport connection to the receiving hub.

The non-USB connection between the transmitter hub and the receiver hub can be any suitable high speed and inexpensive interface, including physical connection over copper wire such as the aforementioned category 5 cabling, fiber optic connection, or infrared connection.

The receiver hub includes a complementary non-USB connector, and a complementary non-USB-to-USB translator, all for converting non-USB data transport from the transmitter hub into standard USB protocol. The receiver hub further includes at least one, and preferably several, USB "A" connectors for receiving connections from downstream peripherals.

Because a non-USB data transport connection is used between the transmitter hub and the receiver hub, the effective cable length of USB transmissions is limited only by the cable length of the selected non-USB interface, and possibly by timing considerations of the non-USB data transport protocol. For serial data transmission using differential pairs over category 5 cabling, it is possible to extend the effective length to hundreds of feet. Moreover, category 5 cabling is ubiquitous, in that it is typically selected for wiring of local area networks. Accordingly, for installations with existing local area networks, it is possible to use existing cabling, thereby allowing extension of USB capabilities with virtually no installation overhead.

In related aspects, particularly useful where the non-USB connector matches pre-existing connectors, such as the aforementioned RJ45 connector, both the transmitter hub and the receiver hub are equipped with specialized electronics that prevent damage if the transmitter hub or the receiver hub is connected to an inappropriate connection. For example, in an installation with a pre-existing local area network using category 5 cabling with RJ45 connectors, the specialized electronics prevent damage to the transmitter hub and the receiver hub if those hubs were accidentally connected to the local area network; and likewise the electronics prevent damage to the local area network through accidental connection of the transmitter hub or the receiver hub.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
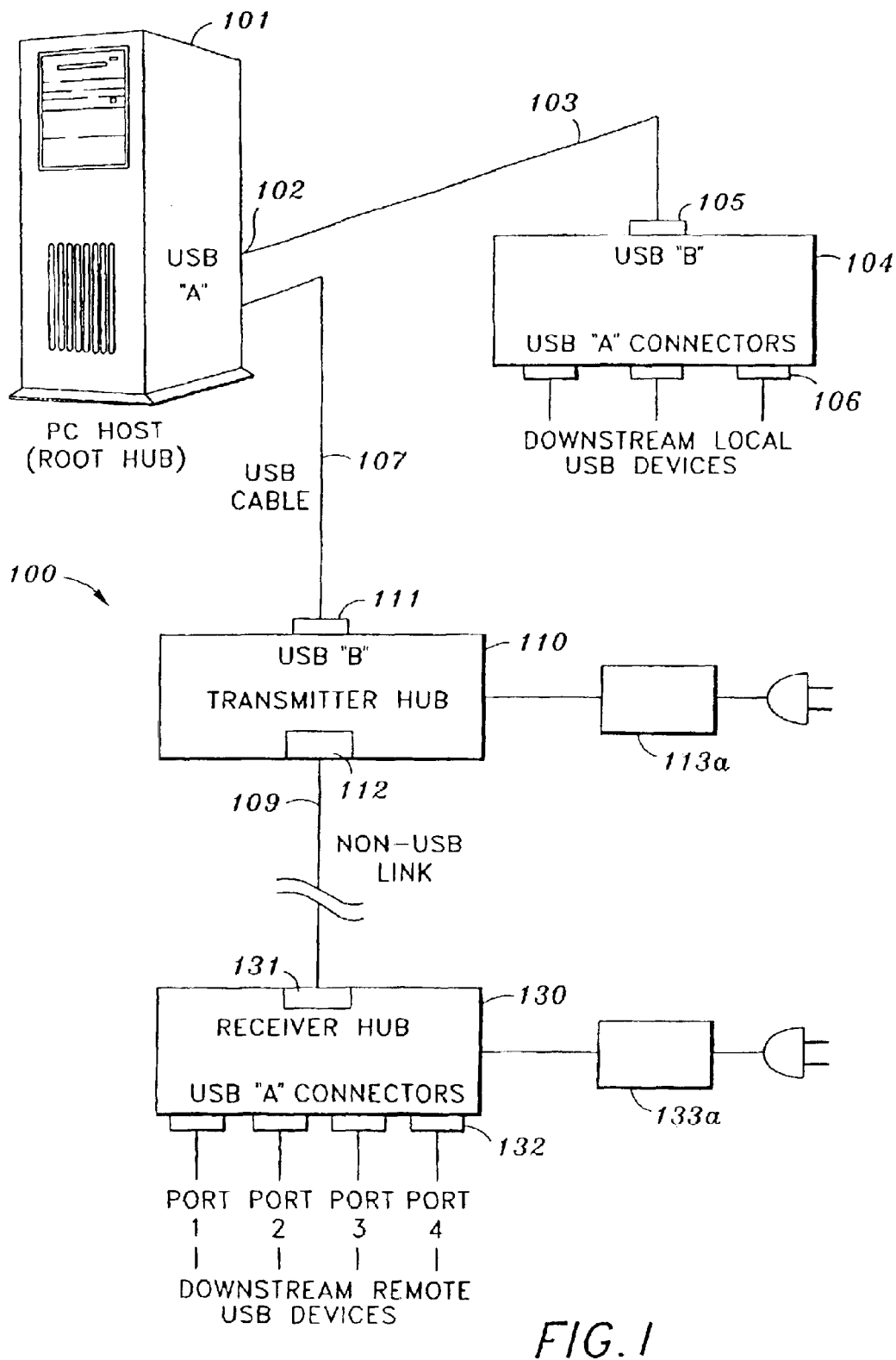
FIG. 1 is a representational view of a USB system incorporating a transmitter hub and a receiver according to the invention.

FIG. 1 is a representational view of a universal serial bus (USB) system 100 incorporating a transmitter hub 110 and a receiver hub 130 according to the invention. As shown in FIG. 1, a USB system includes a root hub in the form of a host PC 101 having connectors 102 for connection to USB cabling. Preferably, connectors 102 are USB "A" type connectors which are preferred for use in connection to downstream devices. Also shown in FIG. 1 is a standard USB hub 104 connected to the root hub 101 via a standard USB cable 103 which connects to hub 104 using a USB "B" connector 105. Hub 104 permits connection of local downstream USB devices at ports 106, which preferably use USB "A" type connectors.

Transmitter hub 110 is also connected to root hub 101, over a standard USB cable 107 connected at one end to USB "A" type connector 102 in root hub 101 and at the other end thereof to USB "B" type connector 111 in the transmitter hub. Transmitter hub 110 is self-powered as shown at 113, although it may also be bus-powered. Transmitter hub 110 further includes a USB-to-non-USB translator which translates USB communications from cable 107 into a non-USB data transport format. The non-USB data transport format is transmitted out of transmitter hub 110 over connector 112. Preferably, connector 112 is a non-USB connector so as to prevent confusion of end user who might otherwise attempt to connect transmitter hub 110 to incompatible USB devices.

The non-USB data transport format from transmitter hub 110 is transmitted from connector 112 onto a non-USB link 109, which may be any suitably high-speed link including copper wire, fibre optic or infrared link. Preferably, however, non-USB link 109 is a category 5 cable which is the cabling that is extensively used in installations of local area networks. Category 5 cabling is suitable for high-speed data transmissions, and has found use, for example, in local area networks with installation speeds of up to 1 GB per second. Of course, any suitably high-speed non-USB link may be employed, so long as the link is sufficiently fast so as to avoid introducing delays and other factors that are non-USB compliant. For example, USB utilizes an unterminated transmission scheme which currently limits cable lengths to a 70 nsec propagation delay, so as to avoid signaling reflections that might interfere with data transmission. Accordingly, it is preferable that non-USB link 109 be terminated, so as to remove the 70 nsec limit on propagation delay and thereby provide for cable lengths of up to hundreds of feet.

Receiver hub 130 is located at the remote end of non-USB link 109, and is connected to non-USB link 109 with connector 131. Connector 131 is preferably a non-USB connector, and preferably is complementary to connector 112 of the transmitter hub. If category 5 cabling is used, then it is further preferred that both connector 112 and connector 131 be an RJ45 connector, which is again ubiquitous because of wide spread use in installations of local area networks.

Receiver hub 130 includes a non-USB-to-USB translator which translates communication in the non-USB data transport format provided by transmitter hub 110 into a USB-standard format. Ports 132 are each provided with USB "A" type connectors for connection to downstream remote USB devices.

Unless receiver hub 130 can be powered from non-USB link 109, receiver hub 130 must be self-powered, as shown at 133a.

By virtue of the arrangement shown in FIG. 1, remote USB devices can be located physically at distances far in excess of the five meter limit for USB cabling. Particularly in cases where non-USB link 109 is a category 5 cable, for example, the transmitter hub 110 and receiver hub 130 can be positioned up to several hundred feet apart, thereby allowing remote USB devices to communicate with root hub 101 at extended distances.

Figure 2:
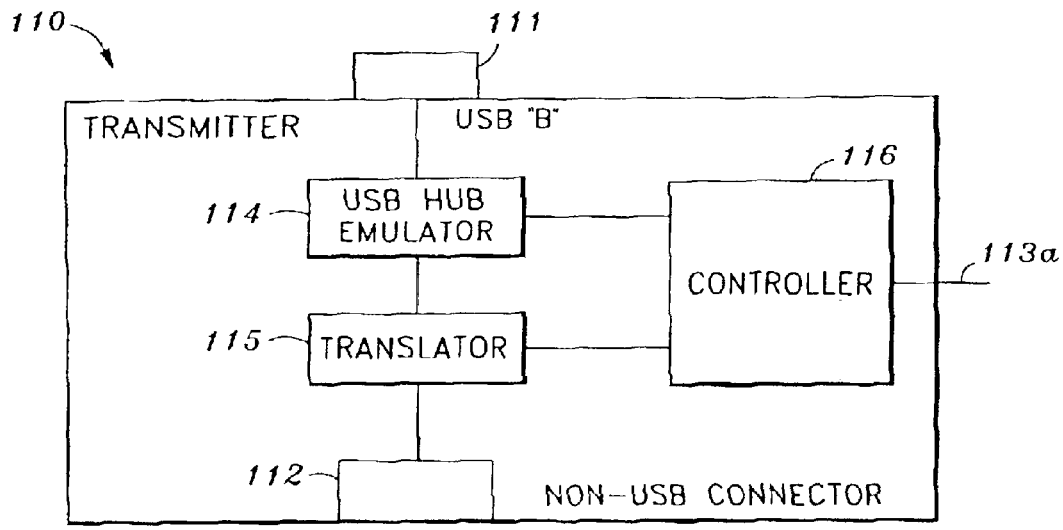
FIGS. 2 and 3 are detailed block diagrams of the transmitter hub and the receiver hub, respectively.

FIG. 2 is a detailed block diagram of transmitter hub 110, showing connectors 111 and 112 with USB emulator 114 and translator 115 connected therebetween. Emulator 114 and translator 115 operate under control of controller 116, which may be powered at 113a if transmitter hub 110 is a self-powered hub. Specifically, under control of controller 116, USB emulator 114 emulates the needed USB protocol transmissions such as for attach and detach operations, as well as maintenance of a device enumeration table. Likewise, under control of controller 116, translator 115 translates USB communications to a non-USB data transport format. Preferably, the non-USB data transport format provided by translator 115 is a serial data transport format.

Figure 3:
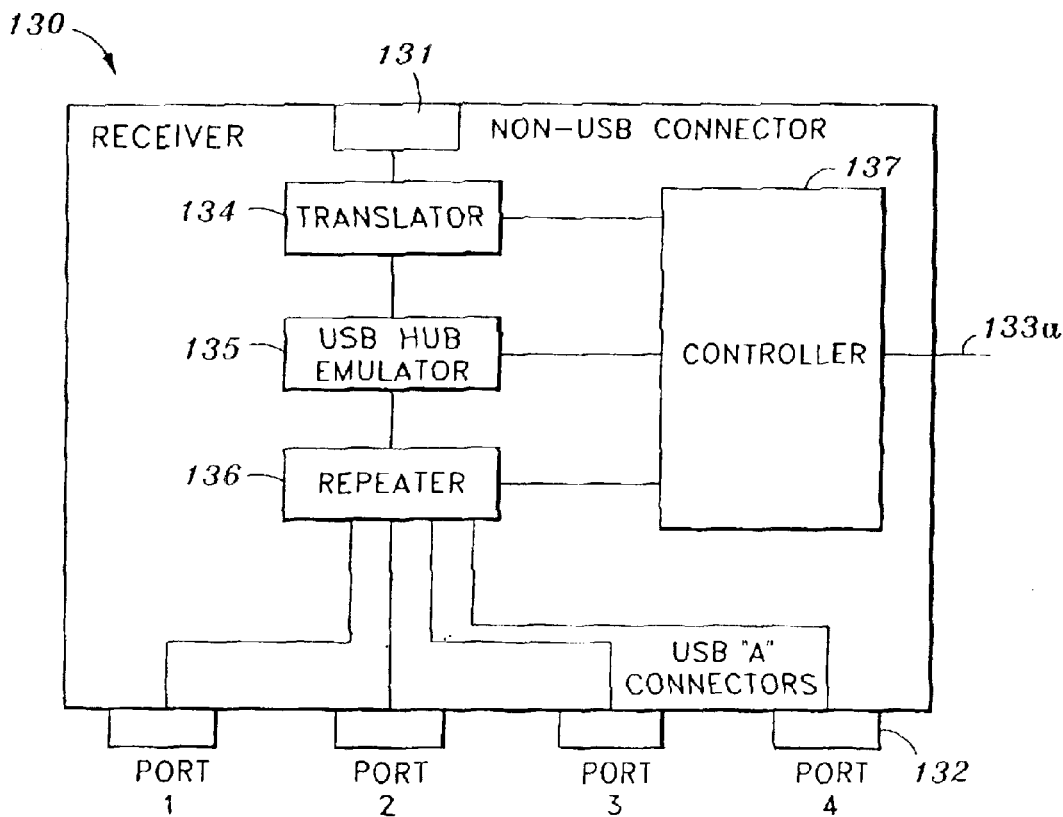

FIG. 3 is a detailed block diagram of receiver hub 130, showing connectors 131 and 132 with translator 134, USB emulator 135 and repeater 136, all connected therebetween. Translator 134, USB emulator 134 and repeater 136 all operate under control of controller 137, which ordinarily is powered at 133a if non-USB link 109 is not capable of providing power. Specifically, under control of controller 137, translator 134 translates from the non-USB data transport format provided by translator 115 into standard USB format. The USB data format is provided to USB emulator 135, which, under control of controller 137, emulates a USB connection. For example, and complementarily to the services provided by USB emulator 114, USB emulator 135 provides attachment and detachment services, and maintains an enumeration table of attached devices. In-addition, emulator 135 reports that receiver hub 130 is a self-powered hub, regardless of whether it receives power from non-USB link 109 or from power 133a. Output of USB emulator 135 is provided to repeater 136, which operates under control of controller 137 to repeat USB data transmissions to each of ports 132.

Figure 4:
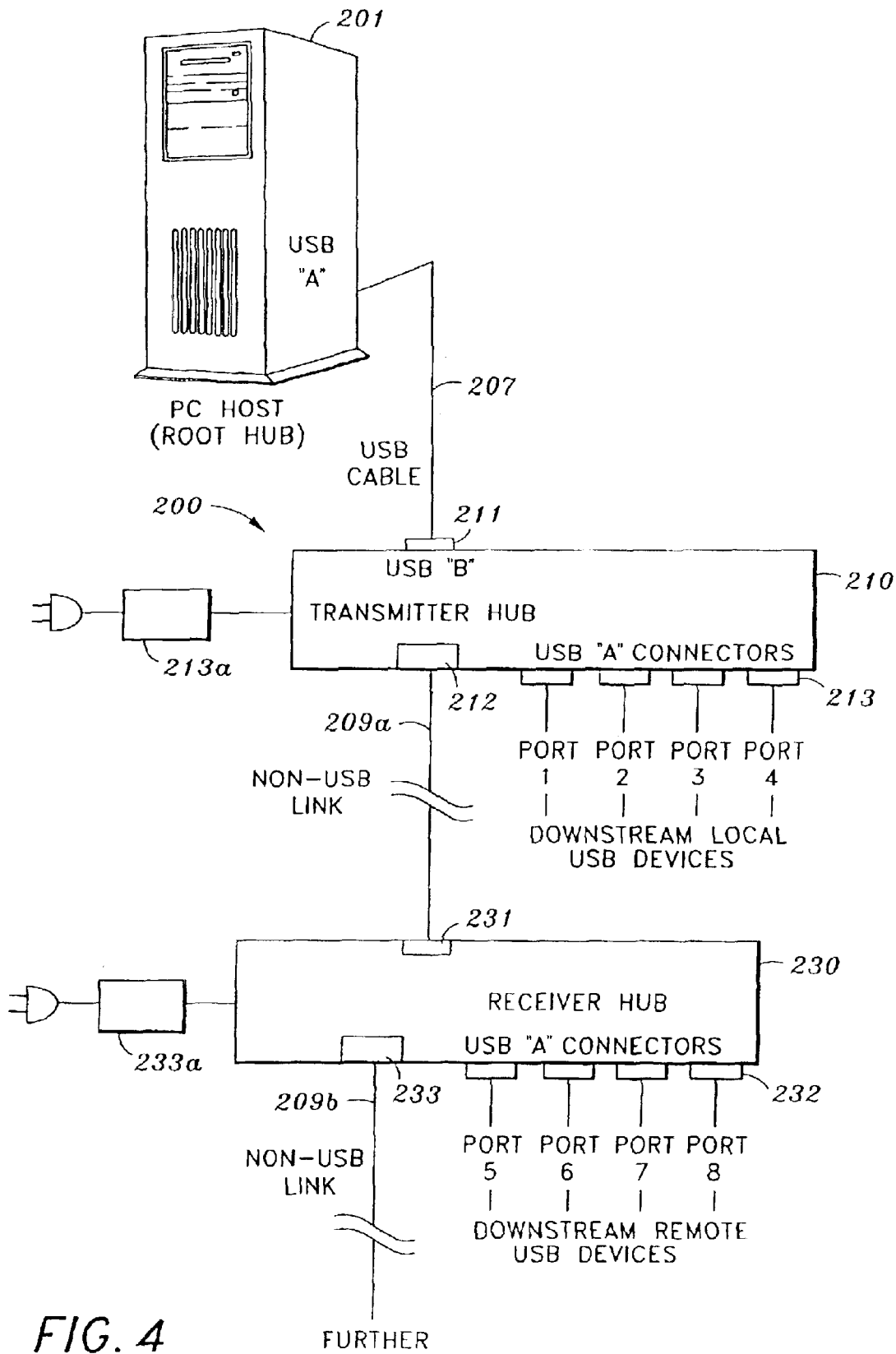
FIG. 4 is a representational view of a USB system incorporating a transmitter hub and a receiver hub according to second embodiments of the invention.

FIG. 4 is a representational view of USB system 200 using transmitter hub 210 and receiver hub 230 according to second embodiments of the invention. As shown in FIG. 4, a root hub such as a PC host 201 includes a USB "A" type connector for connection to standard USB cable 207. USB cable 207 connects to a transmitter hub 210 at a USB "B" connector 211. Transmitter hub 210 includes standard USB "A" connectors 113 for connection to downstream ones of local USB devices. In addition, transmitter hub 210 includes a non-USB connector 212 for connection to non-USB link 209a. Transmitter hub 210 includes a USB-to-non-USB translator which translates USB communications into a non-USB data transport format for transmission out of connector 212 onto non-USB link 209a. Transmitter hub 210 can be bus-powered or self-powered as shown at 213a.

Receiver hub 230 includes non-USB connector 231 for connection to non-USB link 209a, and further includes USB "A" type connectors 232 for connection to downstream ones of remote USB devices. As in the first embodiment, receiver hub 230 includes a non-USB-to-USB translator which translates communications received from connector 231 in a non-USB data transport format into standard USB format. If either of non-USB links 209a and 209b is capable of providing power, then receiver hub 230 can be powered from links 209a or 209b but more preferably receiver hub 230 is self-powered as shown at 233a.

Receiver hub 230 further includes a non-USB connector 233 for cascade connections of further non-USB receiver hubs over non-USB link 209b. In this regard, receiver hub 230 essentially includes a further transmitter hub (described below in connection with FIG. 6), so as to translate USB communications into a non-USB data transport format. Preferably, the non-USB data transport format is identical to that provided from transmitter hub 210, but it is possible to use a different non-USB data transport format, if desired.

Figure 5:
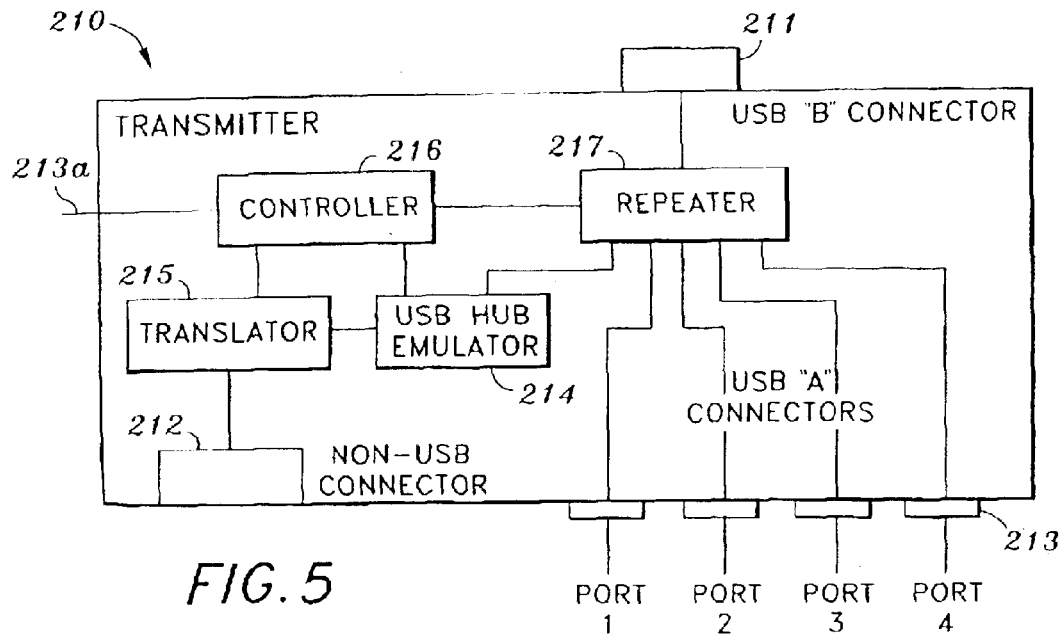
FIGS. 5 and 6 are detailed block diagrams of second embodiments for the transmitter hub and the receiver hub, respectively.

FIG. 5 is a detailed block diagram showing transmitter hub 210. As shown in FIG. 5, transmitter hub 210 includes USB "B" connector 211 and USB "A" connectors 213 connected through repeater 217. Repeater 217 operates under control of controller 216 which may be powered as shown at 213a. Repeater 217 provides a repeated USB output that is provided to USB emulator 214. Emulator 214 provides attachment/detachment services for remote USB devices, and in addition maintains an enumeration table for such remote devices. Translator 215 translates USB formatted data into a non-USB data transport format, and provides such data to connector 212. Emulator 214, translator 215 and repeater 217 all operate under control of controller 216.

Figure 6:
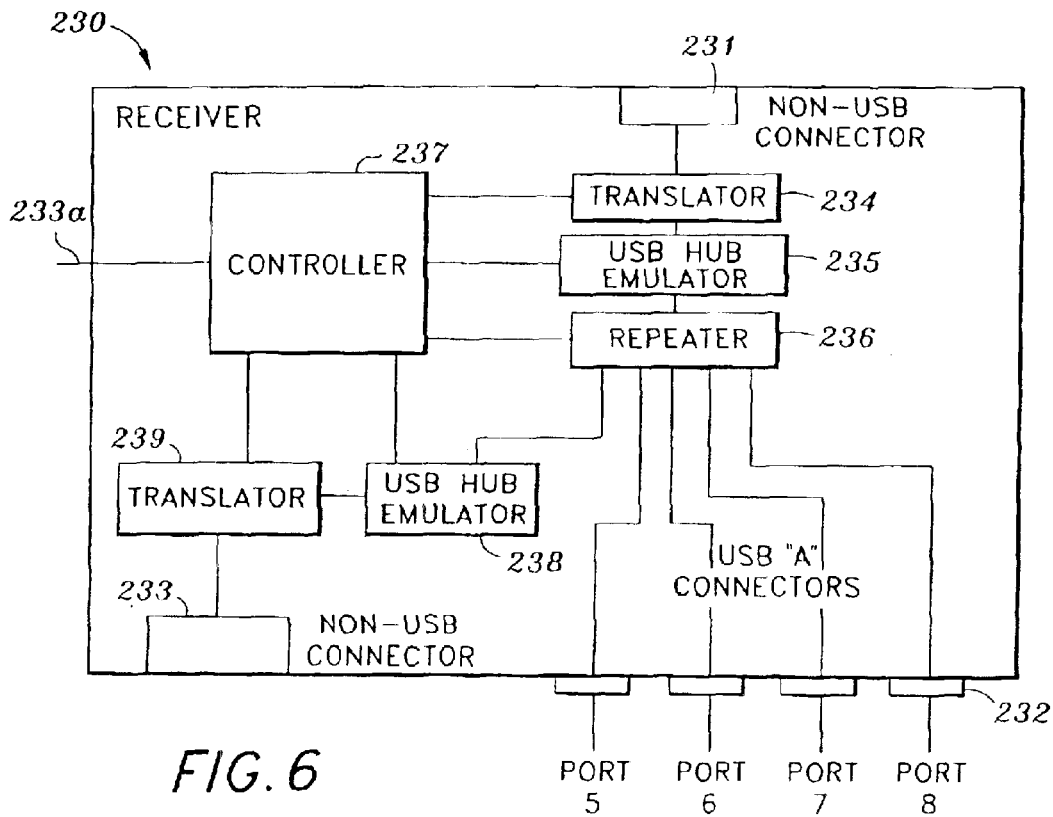

FIG. 6 is a detailed block diagram of receiver hub 230, showing non-USB connector 231 and USB "A" type connectors 232, with translator 234, emulator 235 and repeater 236 connected therebetween. Translator 234, emulator 235 and repeater 236 all operate under control of controller 237 which is preferably powered at 233a and, in fact, must be powered at 233a if non-USB links 209a and 209b are not capable of providing power. Specifically, translator 234 translates from the non-USB data transport format provided by translator 215 into a USB format, and provides the translated data to USB emulator 235. USB emulator 235 provides detach/attach services for remote USB devices, and maintains an enumeration table for such devices. In addition, emulator 235 reports that receiver hub 230 is a self-powered hub regardless of whether it receives power from non-USB links 209a or 209b or from power 233a. Repeater 236 repeats the USB data transmissions to each of ports 232.

Repeater 236 also provides the USB data to a further transmitter for transmission in cascaded format over further non-USB connections. Specifically, a transmitter similar to that shown at 110 is included within receiver 230, and includes USB emulator 238 and translator 239. Emulator 238 and translator 239 both operate under control of controller 237, so as to provide for USB emulation services (attachment/detachment and enumeration tables) and translation from USB to non-USB data transport format, and transmission of such non-USB data transport format to connector 233.

Figure 7:
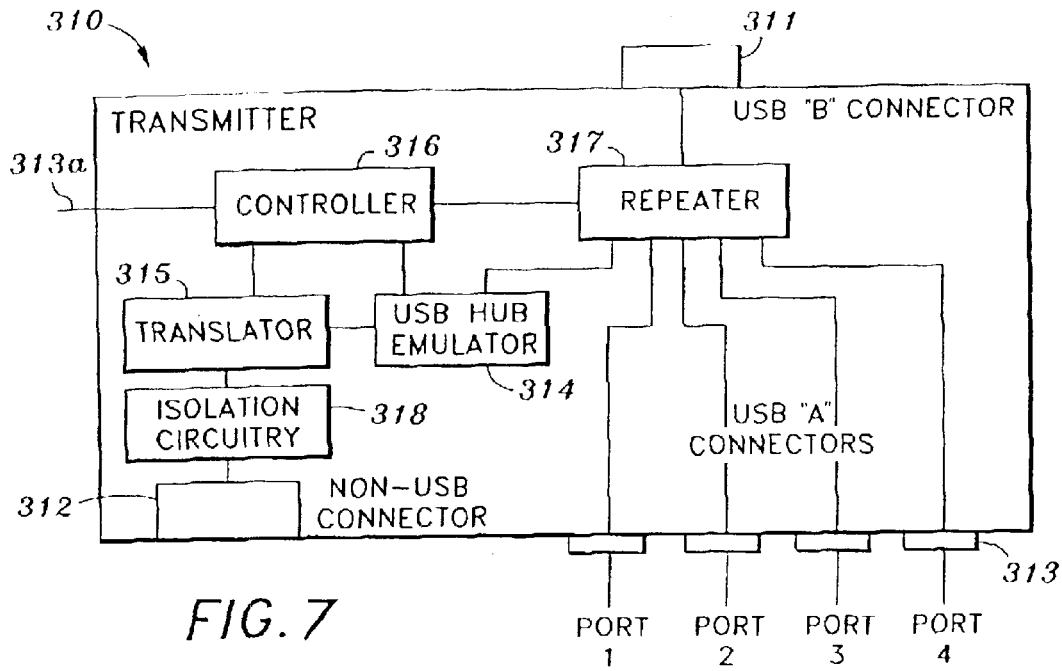
FIGS. 7 and 8 are detailed block diagrams for third embodiments of the transmitter hub and the receiver hub, respectively.
Figure 8:
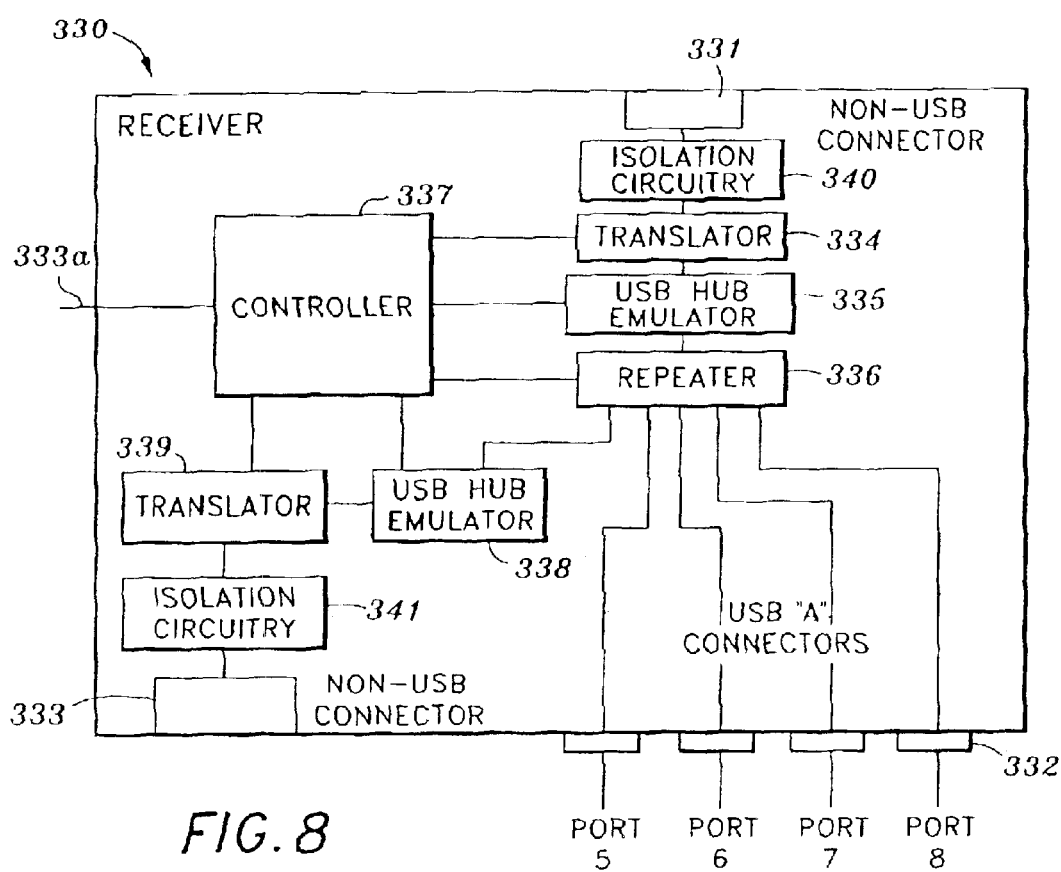

FIGS. 7 and 8 are detailed block diagrams, showing third embodiments of transmitter and receiver hubs according to the invention. One way in which these third embodiments differ from the first two is in the provision of isolation circuitry at non-USB connectors, with the isolation circuitry being provided to prevent damage that might otherwise be caused by connection to interfaces other than the non-USB data transport connection. Specifically, isolation circuitry is provided so as to prevent damage to the receiver or transmitter hub that might be causes when connecting such hubs to inappropriate circuitry. Likewise, the isolation circuitry is provided to prevent damage caused by the receiver or transmitter hub when connected to inappropriate circuitry.

Thus, as shown in FIG. 7, transmitter hub 310 includes a USB "B" connector 311 and repeater 317 for repeating USB communications to each of USB "A" connectors 313. Repeater 317 further repeats USB communications to USB emulator 314, for translation by translator 315 to a non-USB data transport format, and communication over non-USB connector 312. Emulator 314, translator 315 and repeater 317 operate under control of controller 316, which may be bus-powered or self-powered at 313a.

Interposed between translator 315 and connector 312 is isolation circuitry 318. The isolation circuitry prevents damage that otherwise might be caused by connection of transmitter 310 to an interface other than the pre-designated non-USB data transport connection. Specifically, isolation circuitry 318 prevents damage to the transmitter, and further prevents damage caused by the transmitter.

In FIG. 8, receiver 330 includes non-USB connector 331 and translator 334 which translates non-USB data transport format into USB format. The USB formatted data is provided to USB emulator 335 and to repeater 336, which repeats the USB data to each of USB "A" connectors 332. Repeater 336 also provides the USB communications to USB emulator 338 and to translator 339, for translation to a non-USB data transport format and communication out over non-USB connector 333. Each of translator 334, emulator 335, repeater 336, emulator 338, and translator 339, is controlled by controller 337. Receiver 330 may be powered from non-USB links at connectors 331 or 333, if either of such links can provide power, but more preferably is self-powered at 333a.

Interposed between connector 331 and translator 334 is isolation circuitry 340. Isolation circuitry 340 prevents damage that otherwise might be cause by connection of receiver 330 to a non-USB data transport connection. Specifically, isolation circuitry 340 prevents damage to receiver 330, as well as damage caused by receiver 330. Likewise, interposed between translator 339 and connector 333 is isolation circuitry 341. Isolation circuitry 341 may be identical in construction to isolation circuitry 340 in a case where the non-USB link at connector 333 is identical to the non-USB link at connector 331. If the links are different, however, isolation circuitry 341 is tailored for the particular format of the non-USB link at connector 333. In any event, isolation circuitry 341 operates to prevent damage that otherwise might be caused by connection to interfaces other than the non-USB data transport connection at connector 333. Specifically, damage both to receiver 330 and damage caused by receiver 330 are prevented.

It should be recognized that isolation circuitry similar to that indicated at 318, 340 and 341 may be provided in the first embodiment of the invention shown in FIGS. 1 through 3.

The invention has been described with respect to particular illustrative embodiments. It is to be understood that the invention is not limited to the above described embodiments and that various changes and modifications may be made by those of ordinary skill in the art without departing from the spirit and scope of the invention.

What is claimed is:

1. A transmitter hub comprising:
   a USB cable of which one side is connected to the transmitter hub and the other side of the cable is a USB "A" connector;
   a USB-to-non-USB translator which translates USB communications into a non-USB digital data transport format; and
   a non-USB connector for connecting a non-USB cable, the non-USB cable is connected with a receiver hub.

2. A transmitter hub according to claim 1, wherein the non-USB cable includes a category 5 cable.

3. A transmitter hub according to claim 1, wherein the non-USB cable includes an RJ45 connector.

4. A device for extending USB connectivity comprising:
   a transmitter hub and a receiver hub,
   wherein the transmitter hub includes a USB cable, a USB-to-non-USB translator which translates USB communications into a non-USB digital data transport format, and a communication unit for communicating with the receiver hub in the non-USB data format, one side so the USB cable is connected to the transmitter hub and another side of the cable is a USB "A" connector, and
   wherein the receiver hub includes a communication unit for communicating with the transmitter hub in the non-USB data format, a non-USB-to-USB translator for translating the non-USB data format into the USB data format, and the USB "A" connector.

5. A device for extending USB connectivity according to claim 4, wherein the communication unit includes a connector for connecting a cable.

6. A device for extending USB connectivity according to claim 5, wherein the communication unit's connector comprises an RJ45 connector.

7. A device for extending USB connectivity comprising:
   a transmitter hub and a receiver hub,
   wherein the transmitter hub includes a USB "B" connector, a USB-to-non-USB translator which translates USB communications into non-USB digital data transport format, and a communication unit for communicating with a receiver hub in the non-USB data format, and
   wherein the receiver hub includes a communication unit for communicating with a transmitter hub in the non-USB data format, a non-USB-to-USB translator for translating the non-USB data format into the USB data format, and a USB "A" connector.

8. A device for extending USB connectivity according to claim 7, wherein the communication unit includes a connector for connecting a cable.

9. A device for extending USB connectivity according to claim 8, wherein the communication unit's connector comprises an RJ45 connector.

\* \* \* \* \*